(12) United States Patent  
Barton

(10) Patent No.: US 6,210,266 B1  
(45) Date of Patent: Apr. 3, 2001

(54) PRESSURE RELIEF VALVE AND METHOD OF MANUFACTURING THE SAME

(75) Inventor: Richard J. Barton, Port Huron, MI (US)

(73) Assignee: Sarnamotive Blue Water, Inc., Marysville, MI (US)

( * ) Notice: Subject to any disclaimer, the term of this patent is extended or adjusted under 35 U.S.C. 154(b) by 0 days.

(21) Appl. No.: 09/268,607

(22) Filed: Mar. 15, 1999

(51) Int. Cl.$^7$ ...................................................... B60H 1/26
(52) U.S. Cl. ............................................. 454/162; 137/855
(58) Field of Search ................................... 454/162, 164, 454/165; 137/855, 852, 859

(56) References Cited

U.S. PATENT DOCUMENTS

| | | |
|---|---|---|
| 4,702,156 | 10/1987 | Sano . |
| 4,781,106 * | 11/1988 | Frien . |
| 5,105,731 * | 4/1992 | Kraus ..................... 454/162 |
| 5,105,849 | 4/1992 | Clough . |
| 5,194,038 * | 3/1993 | Klomhaus et al. ................... 454/162 |
| 5,263,895 * | 11/1993 | Kraus et al. ........................ 454/162 |
| 5,355,910 * | 10/1994 | Gies et al. .......................... 454/162 |
| 5,419,739 | 5/1995 | Lewis . |
| 5,492,505 * | 2/1996 | Bell et al. ............................ 454/162 |
| 5,601,117 * | 2/1997 | Lewis et al. . |
| 5,759,097 | 6/1998 | Bernoville et al. . |
| 5,823,870 * | 10/1998 | Emerling et al. ..................... 454/162 |
| 5,904,618 * | 5/1999 | Lewis .................................. 454/162 |

FOREIGN PATENT DOCUMENTS

| | | |
|---|---|---|
| 2273153 | 6/1994 | (GB) . |
| 2273456 | 6/1994 | (GB) . |
| 2330793 | 5/1999 | (GB) . |
| WO 95/30528 | 11/1995 | (WO) . |

* cited by examiner

Primary Examiner—Harold Joyce  
(74) Attorney, Agent, or Firm—Young & Basile, P.C.

(57) ABSTRACT

A flap-type pressure relief valve for venting of pressure out of, for example, an automobile passenger compartment has a flap assembly manufactured by a co-molding operation and inserted into a valve housing to block the flow of air therethrough. The valve flap assembly includes a flap carrier frame formed from a relatively rigid plastic in the first shot of a two-shot co-molding process, and at least one flap formed from a relatively flexible plastic in the second shot. The co-molding joins the flap to a first perimeter wall of the frame along an edge of the flap, and the flap is sufficiently flexible to bend about a line adjacent the edge. In a two flap version, a second flap co-molded into connection with a second perimeter wall of the frame. The resulting flap assembly can be easily connected with the separately-molded valve housing by securing the frame to the housing such that the flaps are positioned over valve seat within the housing. The flaps are co-molded into connection with the frame such that when the frame is secured to the housing to position the flaps over the air passages, the flaps are bent away from the as-molded configurations, thereby generating elastic force urging the flaps toward the respective valve seats. The flaps can have rigid plastic stiffeners co-molded into connection therewith. The stiffeners are preferably formed simultaneously with the frame in the first shot of the co-molding process.

44 Claims, 2 Drawing Sheets

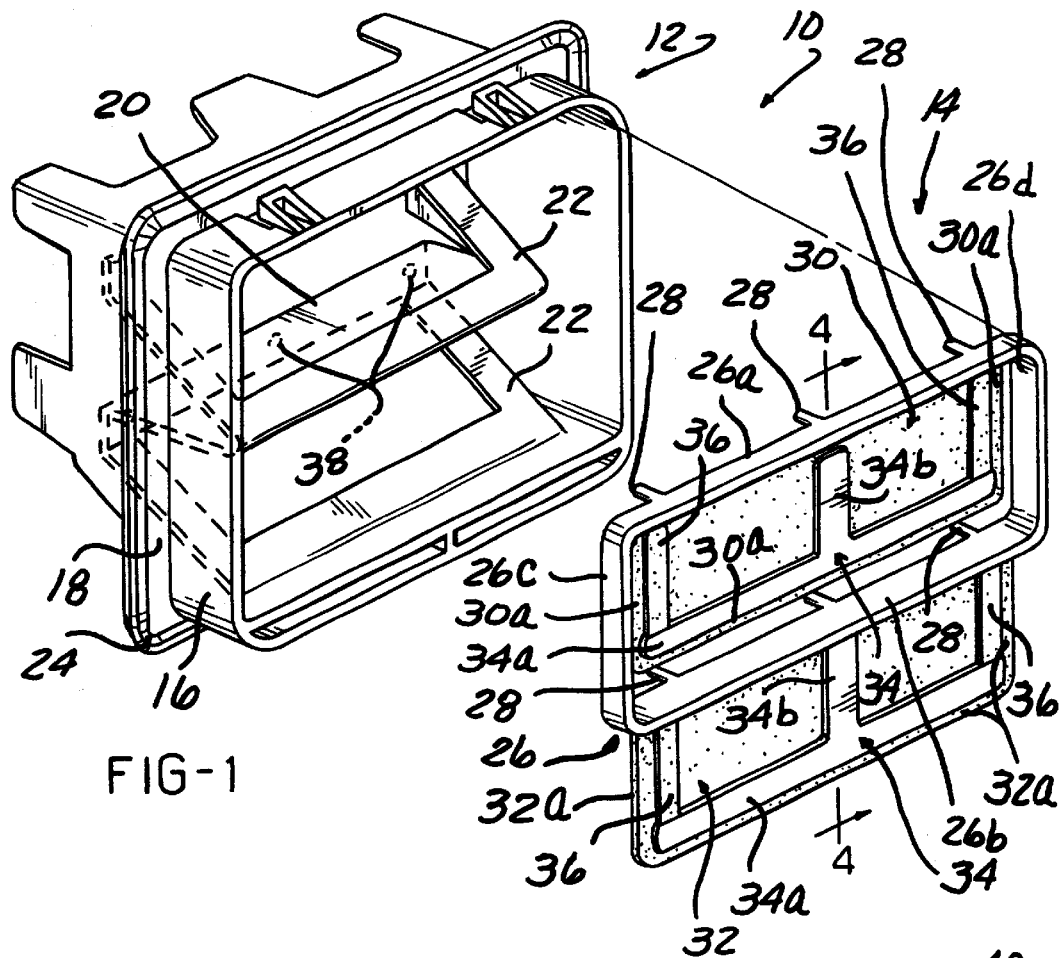
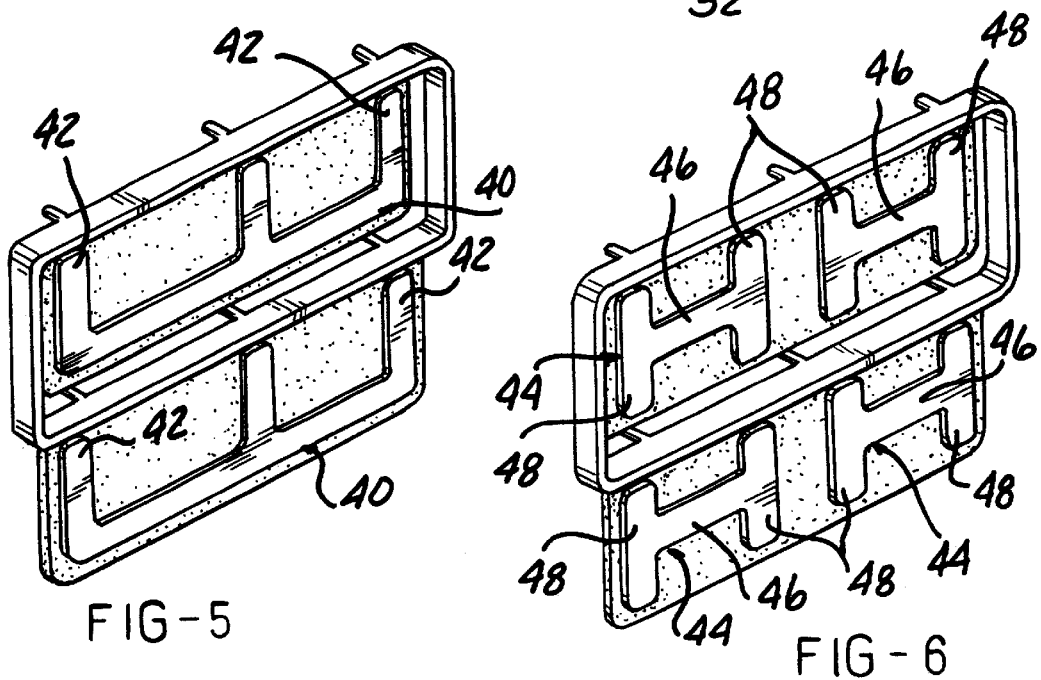

PRESSURE RELIEF VALVE AND METHOD OF MANUFACTURING THE SAME

FIELD OF THE INVENTION

This invention relates generally to one-way pressure relief valves, and in particular to such a valve for use in conjunction with a ventilation system for a passenger compartment of an automotive vehicle.

BACKGROUND OF THE INVENTION

One-way, flap-type pressure relief valves are commonly used in applications such as vehicle ventilation systems. Typically, the valve serve to relieve over-pressure that can occur within a nearly air-tight passenger compartment of a vehicle when, for example, a door of the vehicle is rapidly closed, while preventing the entry of air from outside the vehicle into the passenger compartment.

Valves used for this purpose generally include a frame or housing for mounting within an aperture formed in a panel enclosing the passenger compartment and defining an air passageway through the panel. The housing has one or more internal valve seats over which a plurality of valve flaps lie. The flaps include relatively thin, flexible members and overlie the valve seats on a side of the housing facing exterior of the passenger compartment. Each flap is fixed to the housing along one peripheral edge.

When an over-pressure condition occurs within the passenger compartment, the air pressure forces the flaps to move away from the valve seats, bending or hinging adjacent the fixed edge to allow air to flow through the air passageway out of the passenger compartment. When the air pressure has equalized on both sides of the valve or when the pressure on the exterior becomes greater, the flaps swing or bend back to engage the valve seats and block airflow into the passenger compartment.

Valves of this general type are often manufactured by injection molding the housing and the valve flaps as separate pieces and then joining the two components by any one of several different methods. U.S. Pat. No. 5,601,117 teaches that apertures formed along an edge of the flap are placed over pins projecting from the corresponding portion of the housing. The ends of the pins are then flattened to form locking caps which secure the flap over the pin. U.S. Pat. No. 5,419,739 discloses a valve flap in the form of a flexible sheet having integrally formed tabs which are forced through respective slots formed in the housing. Each of these various methods of construction has inherent disadvantages, generally related to the fact that producing separate components that must be assembled with one another is time consuming and/or labor intensive, thus making the valve relatively expensive to manufacture.

U.S. Pat. No. 5,355,910 discloses a valve having a flap element formed by extruding a sheet of relatively soft, flexible elastomeric material, and simultaneously extruding one or more strips of relatively rigid plastic onto the surface of the sheet. A first of the strips provides a rigid mounting strip for bolting or otherwise joining the valve element to an associated valve housing. A second of the rigid strips can be formed to extend across the width of the flap adjacent the opposite edge thereof to prevent the valve element from warping or deforming during use. The gap between the mounting strip and the stiffening strip forms a flexible hinge where the flap bends to move between closed and open positions. The continuous extrusion is sheared to the length required for use in a valve assembly, and apertures are formed through the mounting strip so that the flap can be secured to the valve housing.

The extrusion technique requires the rigid strip to extend the full width of the flexible sheet and be a constant thickness and height. The extrusion technique is also unable to produce a plurality of flaps joined together in a top-to-bottom arrangement so that the flaps can then be attached to the valve housing in a single assembly step.

SUMMARY OF THE INVENTION

The present invention provides a valve flap assembly for use with a pressure relief valve which is efficiently and inexpensively produced by a co-molding operation and retains a flexible flap within a rigid frame for attachment to a valve housing. The invention further provides a flap structure that is sufficiently stiff to maintain a desired shape during use.

In accordance with one aspect of the invention, a valve flap assembly includes a relatively rigid flap carrier frame having a plurality of perimeter walls and a relatively flexible flap co-molded into connection with a first perimeter wall of the frame. The flap is joined to the perimeter wall along a hinge edge and is sufficiently flexible to bend about a line adjacent the hinge edge. The resulting flap assembly can be easily connected with a valve housing defining at least one air passage by securing the flap carrier frame to the housing such that a frame surrounds the passage, thus positioning the flap over a valve seat surrounding the passage.

According to a further aspect of the invention, the flap is co-molded into connection with the flap carrier frame in a configuration such that when the flap carrier frame is secured to the housing to position the flap over the air passage, the flap is bent away from the as-molded configuration as the flap comes into contact with the valve seats. This bending generates an elastic force urging the flap toward the valve seat in order to help to ensure that the valve flap closes completely and positively when pressure across the valve has equalized.

In accordance with another feature of the invention, the valve flap assembly includes first and second flaps co-molded into connection with respective first and second perimeter walls of the frame. The first and second walls are parallel with one another so that the frame can be secured to the valve housing to position the flaps over adjacent air passages of the housing. This provides a multi-flap assembly that can be attached to the valve housing as a single unit, thereby reducing manufacturing cost and complexity.

In accordance with a further aspect of the invention, at least one of the flexible flaps has stiffeners co-molded into connection therewith. The stiffeners are preferably formed simultaneously with the flap carrier frame in the first shot of the co-molding process, and the flap is subsequently molded so as to contact and be joined to the stiffener as well as the frame. Each of the stiffeners preferably includes an elongated first segment extending generally parallel to the hinge edge of the flap, and a second segment extending generally perpendicular to the first segment. This construction allows stiffening material to be added to the otherwise flexible flap only in the locations necessary, thus saving material and cost while achieving the desired flap stiffness.

In the embodiment of the flap valve assembly depicted herein, the flap carrier frame is molded to include a plurality of bosses extending therefrom which are inserted through apertures formed in the valve housing. The ends of the bosses distal from the flap carrier may then be flared outwardly by a heat staking process to retain the flap carrier in connection with the housing.

According to another aspect of the invention, a method is provided for producing a valve flap assembly for use in a pressure relief valve, the method including a two-shot co-molding process wherein the first shot forms a flap carrier frame from a relatively rigid plastic material, and the second shot forms a flap from a relatively flexible plastic material such that an edge of the flap is joined to the frame along a first perimeter wall of the frame. The use of the co-molding process allows formation of a flap carrier having a substantially continuous perimeter such that the flap can be molded substantially within the perimeter of the frame, and the frame can then be secured to a valve housing to surround an air passage and locate the flap over the passage.

In the preferred embodiment of the method, two flaps are formed by the second shot, one of the flaps attached to each of two parallel perimeter walls of the frame. The resulting flap assembly formed by this method is a unitary, multi-flap assembly which can be joined to a valve housing in a single operation to position the flaps over respective air passages through the housing.

Also in a preferred embodiment of the method, a flap stiffener is formed substantially simultaneously with the frame in the first shot of the co-molding process. When the flap is formed in the second shot, the flap contacts the stiffener and is joined to both the stiffener and the frame. The use of the co-molding process allows formation of a flexible flap having a stiffener which extends only over selected portions of the flap surface so that a required degree of flap stiffness can be achieved.

BRIEF DESCRIPTION OF THE DRAWINGS

FIG. 1 is an exploded perspective view of a pressure relief valve according to the present invention;

FIG. 5 is a second embodiment of a valve flap assembly according to the invention and;

FIG. 6 is a third embodiment of a valve flap assembly according to the present invention.

DETAILED DESCRIPTION OF THE PREFERRED EMBODIMENT

Referring to FIGS. 1–4, a pressure relief valve 10 according to the present invention is of the type typically used in conjunction with the ventilation system of an automotive vehicle. The valve includes a housing 12 that fits into an aperture formed in a panel enclosing the vehicle's passenger compartment, and a valve flap assembly 14 which is mounted internally to the housing 12 and controls the flow of air (or other gases) into and out of the passenger compartment.

Figure 2:
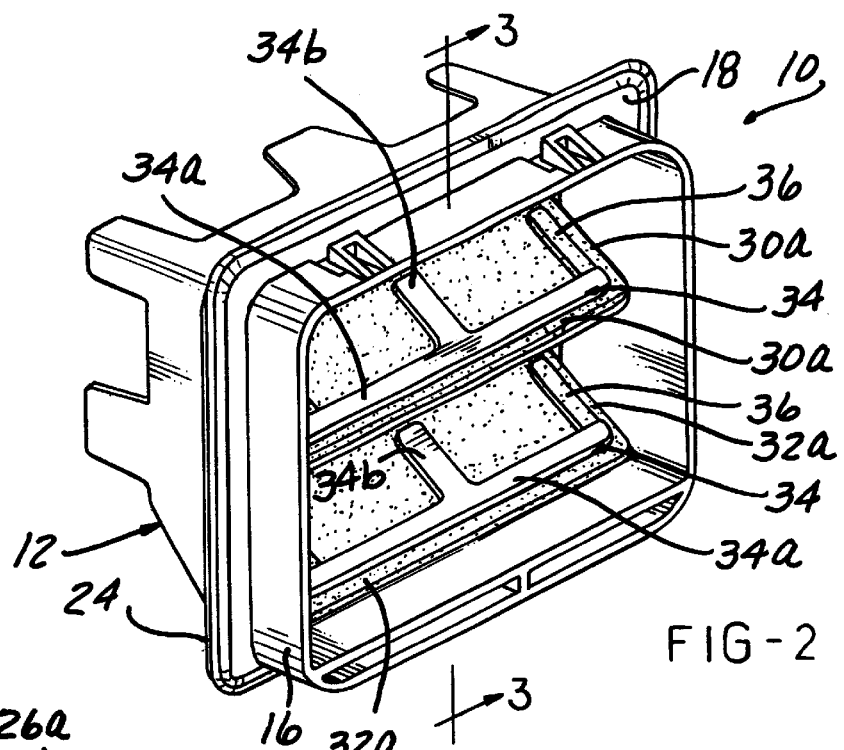
FIG. 2 is an assembly view of the pressure relief valve of FIG. 1.
Figure 4:
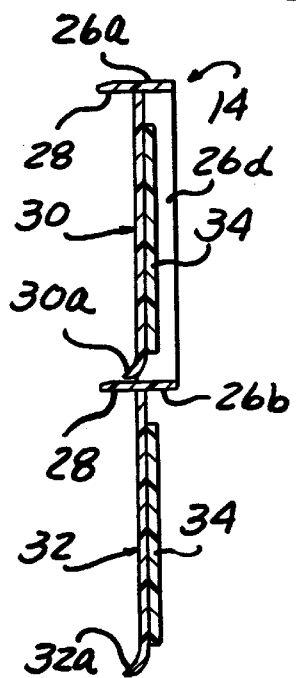
FIG. 4 is a cross-sectional view taken along line 4—4 of FIG. 1.
Figure 3:
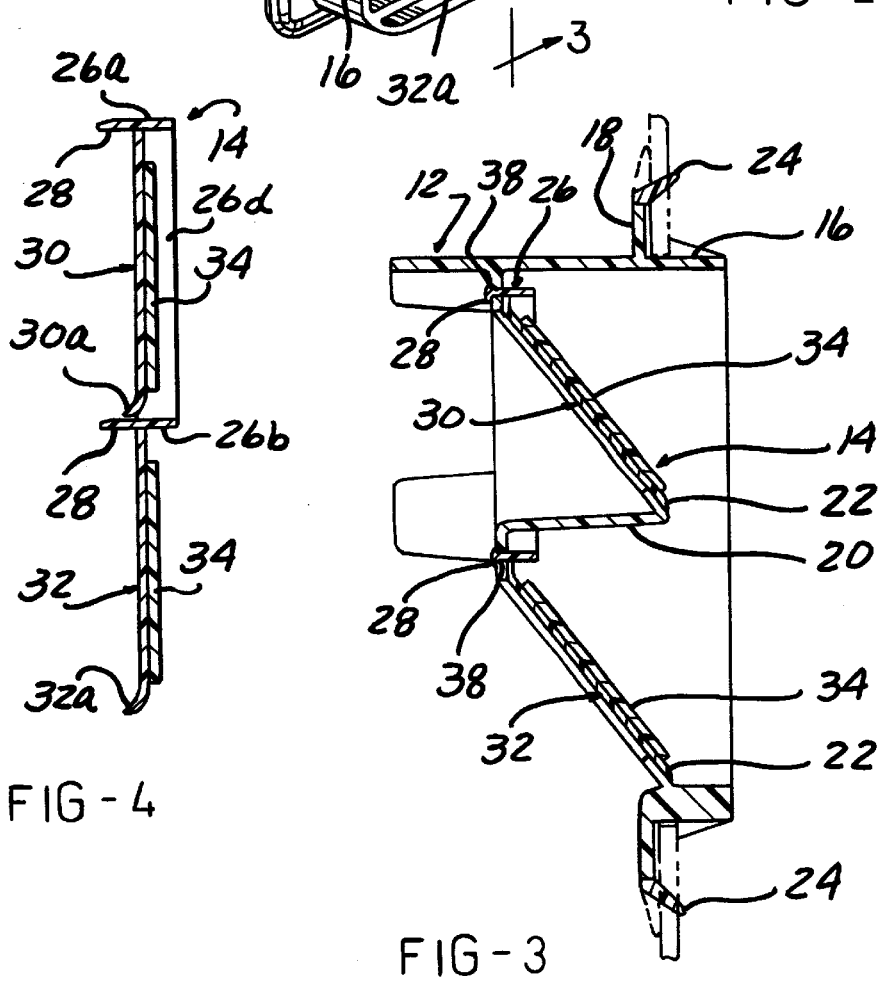
FIG. 3 is a cross-sectional view taken along line 3—3 of FIG. 2.

The housing 12 includes an outer shell 16 having a flange 18 extending outwardly therefrom around its entire perimeter. A middle wall 20 extends horizontally across the approximate center of the housing 12 to define separate upper and lower air passages through the housing 12. The interior of the outer shell 16 and the middle wall 20 define upper and lower valve seat surfaces 22 surrounding the respective air passages. As best seen in FIG. 3, the valve seats 22 are disposed at an angle to the vertical. A panel seal 24 is preferably disposed on the housing flange 18 and is formed of a relatively flexible plastic material.

The valve flap assembly 14 includes a valve carrier frame 26 formed of a relatively rigid plastic material, such as polypropylene, polystyrene or polyvinyl chloride. In the preferred embodiment of the invention, the frame 26 is generally rectangular in shape, including parallel upper and lower perimeter walls 26a,26b connected by left and right perimeter walls 26c,26d. A plurality of pin-like bosses 28 project from the upper and lower perimeter walls of the frame 26 and are preferably molded integrally with the frame.

An upper and a lower flap 30,32 are attached along the respective uppermost edges to the upper 26a and lower perimeter walls 26b respectively. The flaps 30,32 are formed of a relatively pliable plastic material, such as thermoplastic elastomer, by a co-molding process which joins the flaps to the frame 26.

As used herein, the term co-molding refers to a well-known injection molding process in which a quantity of a first fluid material is injected into a first mold cavity formed by a pair of dies, allowed to at least partially solidify, then the dies are moved relative to one another to create a second mold cavity which is only partially filled by the first material. A second quantity of a second fluid thermoplastic material is injected into the second mold cavity, coming into contact with the solidified first material so that when the second material sets the two quantities of material are physically joined to one another. The co-molding process allows a single, integral part to be formed from two or more different types of plastic material in a single mold, with no further assembly steps required.

Each flap 30,32 has a stiffener 34 joined to and overlaying a portion of its surface. The stiffeners 34 are made of a relatively rigid plastic material, preferably the same as that used for the frame 26. In a preferred embodiment of the invention, each stiffener 34 includes a first elongated segment 34a extending substantially parallel to the lower edge of the flap and a second segment 34b extending substantially perpendicular to the first segment along the vertical center line of the flap. The stiffener 34 can contact the surface of the flap, or the stiffener can be embedded in and partially or completely surrounded by the material of the flap.

Each flap 30,32 has a generally planar central portion and a peripheral seal portion 30a,32a surrounding the central portion along all edges other than the hinge edge. According to the preferred embodiment of the invention, the seal portion 30a,32a is slightly curved out of the plane defined by the central portion (see FIG. 4). When viewed in cross-section, the seal portions 30a,32a taper off in thickness, coming to a point at their tips.

In the embodiment of the flap shown in FIGS. 1–4, the flap is of a uniform thickness over its entire area except for thickened sections 36 extending adjacent the lateral edges of the flap. These thickened sections 36 serve as flow channels during the injection molding process, aiding the flow of the liquid thermoplastic material throughout the mold cavity. The thickened sections 36 also add somewhat to the stiffness of the flap.

The stiffeners 34 are preferably formed during the first shot of the co-molding process, substantially simultaneously with the flap carrier frame 26. In this way, the formation of the flaps 30,32 during a second shot co-molds the flaps into connection with both the carrier frame 26 and the stiffeners 34.

The valve flap assembly 14 is joined with the valve housing 12 such that the flap carrier frame 26 surrounds the upper air passage and the upper and lower flaps 30,32 overlay the valve seats 22 surrounding the upper and lower air passages respectively. The flap carrier frame 26 is retained in connection with the housing 12 by inserting the bosses 28 through apertures 38 formed in corresponding positions in the housing 12 and subsequently deforming the ends of the bosses distal from the frame by, for example, heat staking.

When the valve flap assembly 14 is installed in the housing 12, the upper and lower flaps 30,32 are forced to bend away from the respective as-molded positions (shown in FIG. 4) such that the flaps lie in contact with the respective valve seats 22 (see FIG. 3). This bending of the valve flaps 30,32 creates an elastic force urging the flaps back toward the as-molded positions and hence into contact with the respective valve seats 22. The embodiment of the valve depicted herein is designed for installation in a generally vertical panel, so that the valves slope downwardly from the hinged edges as the valves rest on the valve seats 22. It is also possible to design a valve according to the present invention for installation in a panel oriented horizontally or at any angle.

The curved ends of the seal portions 30a,32a improve the quality of the seal between the flaps 30,32 and the valve seats 22. Further, the curved seal portions result in quieter operation of the valve, substantially eliminating any "slapping" noise that would otherwise be produced as a completely flat flap meets the valve seat when the flap swings to the closed position.

As viewed in FIG. 3, the interior of the vehicle passenger compartment is on the left of the valve. When the pressure inside the passenger compartment rises above that outside of the compartment, such as when a door of the vehicle is closed suddenly, the air pressure exerts force on the surfaces of the flaps 30,32, causing the flaps to bend about the respective hinge edges where the flaps are joined to the flap carrier frame 26. The flaps 30,32 swing upwardly and away from the respective valve seats 22 thus allowing the pressure inside the passenger compartment to vent to the outside until the pressure has equalized. The flaps 30,32 then swing back into contact with the valve seats 22 to close off the air passages, thus preventing the flow of air or any other gases into the passenger compartment. When the pressure inside and outside of the passenger compartment has equalized, the flaps 30,32 return to the seated and closed positions due to a combination of gravity acting on the flaps and the elastic force caused by the flaps bending upward and away from the as-molded positions.

The flexible plastic material used for the flaps 30,32 is advantageous because the material allows the flaps 30,32 to bend between the closed and open positions, and also because the material provides a better seal between the flap and valve seat when in the closed position. The flexible material, however, may tend to warp or deform during use so that the flap no longer makes contact with the valve seat around the entire perimeter of the air passage. The flap stiffeners 34 attached to the valve surfaces reduce or prevent this type of warping and so prolong the useful life and increase the effectiveness of the valve. The co-molding process allows the stiffeners 34 to be formed in any shape and covering any area or areas of the flap surface as necessary to prevent unwanted warping.

Many different configurations for the stiffeners 34 are possible. FIG. 5 depicts a flap assembly having stiffeners 40 which differ from those of FIGS. 1–4 in having two additional side segments 42 extending adjacent the lateral edges of the flap. Each flap of the embodiment shown in FIG. 6 has two separate H-shaped stiffeners 44, each including a first segment 46 extending generally horizontally across the flap and additional segments 48 extending perpendicular thereto at either end of the first segment.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A valve flap assembly for a pressure relief valve having a housing with at least one valve seat disposed adjacent a surface edge defining at least one interior passage, the assembly comprising:

a flap carrier frame separate from the housing and formed of a first relatively rigid plastic material, the frame including at least one member having a first wall extendible along at least a portion of a perimeter of the passage through the housing, the frame securable to the housing adjacent to the passage such that the first wall is adjacent to the surface edge of the passage; and a flap formed of a second relatively pliable plastic material and having a hinge edge co-molded into connection with the first wall of the frame, the flap bendable about a line adjacent the hinge edge.

2. The valve flap assembly of claim 1 wherein the flap extends toward an interior of the frame.

3. The valve flap assembly of claim 1 wherein the flap is co-molded into connection with the flap carrier frame in a first configuration such that securing of the flap carrier frame to the housing urges the flap into contact with the valve seat surrounding the passage and said contact bends the flap away from the first configuration to a second configuration, said bending generating an elastic force urging the flap toward the valve seat.

4. The valve flap assembly of claim 1 further comprising a second flap formed of the second plastic material and having a hinge edge co-molded into connection with a second wall generally parallel with the first wall, the second flap bendable about a line adjacent the hinge edge.

5. The valve flap assembly of claim 4 wherein the first flap extends toward an interior of the frame and the second flap extends toward an exterior of the frame.

6. The valve flap assembly of claim 1 wherein the flap carrier frame has a plurality of bosses integrally molded therewith and extending therefrom for insertion through respective apertures in the housing to retain the flap carrier frame in connection with the housing.

7. The valve flap assembly of claim 1 wherein the flap has a generally planar central portion and a seal portion surrounding the central portion along all edges other than the hinge edge, and at least a part of the seal portion is curved out of a plane defined by the central portion.

8. A valve flap assembly for a pressure relief valve having a housing defining at least one interior passage, the assembly comprising:

a flap carrier frame formed of a first relatively rigid plastic material and having a plurality of perimeter walls, the frame securable to the housing to surround the passage such that the perimeter walls are adjacent edges of the passage;

a flap formed of a second relatively pliable plastic material and having a hinge edge co-molded into connection with a first of the perimeter walls, the flap bendable about a line adjacent the hinge edge; and at least one flap stiffener co-molded into connection with the flap.

9. The valve flap assembly of claim 8 wherein the flap stiffener comprises an elongated first segment extending generally parallel to the hinge edge of the flap and a second segment extending generally perpendicular to the first segment.

10. A one-way pressure relief valve for use in an automotive vehicle comprising:

a housing defining at least one interior passage and having a valve seat surrounding a periphery of the passage;

a flap carrier frame formed of a first relatively rigid plastic material separate from the frame and secured to the housing to surround the passage, the frame having first and second spaced, generally parallel perimeter walls extending adjacent respective opposite edges of the passage; and a flap formed of a second relatively pliable plastic material and having a hinge edge co-molded into connection with the first perimeter wall of the frame and depending therefrom such that the flap contacts the valve seat of the passage and is bendable adjacent the hinge edge allowing the flap to move away from the valve seat.

11. The valve of claim 10 wherein the flap is co-molded into connection with the flap carrier frame in a first configuration, and when the flap carrier frame is secured to the housing the flap is deflected to a second configuration by contact with the valve seat, said bending generating an elastic force urging the flap toward the valve seat.

12. The valve of claim 10 further comprising:

the housing having a second passage with a corresponding second valve seat; and a second flap formed of the second plastic material and having a hinge edge co-molded into connection with the second perimeter wall of the frame and depending therefrom such that the second flap contacts the valve seat of the second passage and is bendable adjacent the hinge edge allowing the flap to move away from the valve seat.

13. The valve of claim 12 wherein the first and second flaps are co-molded into connection with the flap carrier frame in a first configuration, and when the flap carrier frame is secured to the housing the flaps are deflected to a second configuration by contact with each respective valve seat, said bending generating an elastic force urging the flaps toward the respective valve seats.

14. The valve of claim 10 wherein the flap carrier frame has a plurality of bosses extending through respective apertures in the housing, and ends of the bosses distal from the flap carrier frame are flared outwardly to retain the flap carrier frame in connection with the housing.

15. The valve of claim 10 wherein the flap has a generally planar central portion and a seal portion surrounding the central portion along all edges other than the hinge edge, and at least a part of the seal portion is curved out of a plane defined by the central portion and toward the valve seat.

16. A one-way pressure relief valve for use in an automotive vehicle comprising:

a housing defining at least one interior passage and having a valve seat surrounding a periphery of the passage;

a flap carrier frame formed of a first relatively rigid plastic material and secured to the housing to surround the passage, the frame having first and second spaced, generally parallel perimeter walls extending adjacent respective opposite edges of the passage;

a flap formed of a second relatively pliable plastic material and having a hinge edge co-molded into connection with the first perimeter wall of the frame and depending therefrom such that the flap contacts the valve seat of the passage and is bendable adjacent the hinge edge so that the flap may move away from the valve seat; and at least one flap stiffener co-molded into connection with the flap.

17. The valve of claim 16 wherein the flap stiffener comprises an elongated first segment extending generally parallel to the edge of the flap and a second segment extending generally perpendicular to the first segment.

18. A method of forming a valve flap assembly for use in a pressure relief valve having a housing with at least one valve seat disposed adjacent a surface edge defining at least one passage formed therethrough, the method comprising the steps of:

in a first shot of a two-shot co-molding process, injection molding a flap carrier frame from a relatively rigid plastic material, the frame securable to the housing adjacent to the passage; and in a second shot of the co-molding process, injection molding a flap from a relatively flexible plastic material such that an edge of the flap is joined to the frame along a first perimeter wall of the frame.

19. The method of claim 18 wherein the first shot of the co-molding process further forms at least one flap stiffener such that the flap is molded into connection with the flap stiffener.

20. The method of claim 19 wherein the flap carrier is formed as a frame having a substantially continuous perimeter, and the flap is molded substantially within the perimeter of the flap carrier frame.

21. The method of claim 18 wherein a second flap is formed in the second shot of the co-molding process such that an edge of the second flap is joined to a second perimeter wall of the flap carrier frame, the second perimeter wall being spaced from and generally parallel with the first perimeter wall.

22. The method of claim 21 wherein the frame comprises first and second spaced, generally parallel perimeter walls and the first flap is joined to the first perimeter wall and the second flap is joined to the second perimeter wall.

23. A valve flap assembly manufactured according to the method of claim 18, the assembly comprising:

a flap carrier frame formed of a relatively rigid plastic material, the frame securable to the housing adjacent to the passage; and a flap formed of a relatively flexible plastic material such that an edge of the flap is joined to the frame along a first wall of the frame.

24. The valve flap assembly of claim 23 further comprising:

a hinge edge co-molded into connection with the first wall, the flap bendable about a line adjacent the hinge edge.

25. A method of forming a pressure relief valve comprising the steps of:

forming a valve housing defining at least one internal passage;

in a first shot of a two-shot co-molding process, injection molding a flap carrier frame and at least one flap stiffener from a first relatively rigid plastic material, the flap stiffener comprising a first segment extending generally parallel to an edge of the frame and a second segment extending generally perpendicular to the first segment;

in a second shot of the co-molding process, injection molding at least one flap from a second relatively flexible plastic material, the flap having a edge contacting the flap carrier frame to join the flap to the flap carrier frame, and the flap contacting the stiffener and joined thereto; and securing the flap carrier frame to the valve housing to position the flap over the internal passage.

26. The method of claim 23 wherein the step of securing the flap carrier frame to the valve housing deflects the flap from an as-molded position to thereby generate an elastic force urging the flap toward a closed position covering the internal passage.

27. The method of claim 23 wherein the first shot of the co-molding process further forms a second flap stiffener adjacent to and outside of the frame, and the second shot of the co-molding process further forms a second flap contacting the second flap stiffener to join the second flap to the second flap stiffener and having an edge contacting the flap carrier frame to join the second flap to the flap carrier frame.

28. The method of claim 23 wherein the frame comprises first and second spaced, generally parallel perimeter walls and the first and second flaps are molded to be joined to the first and second perimeter walls respectively.

29. A valve flap assembly for a pressure relief valve having a housing defining at least one interior passage, the assembly manufactured by a process comprising the steps of:

injection molding a flap carrier frame from a first relatively rigid plastic material and having a plurality of perimeter walls, the frame securable to the housing to surround the passage such that the perimeter walls are adjacent edges of the passage; and injection molding at least one flap from a second relatively pliable plastic material such that a hinge edge of the at least one flap is co-molded into connection with a first of the perimeter walls, the flap bendable about a line adjacent the hinge edge.

30. The valve flap assembly of claim 23 wherein the flap extends toward an interior of the frame.

31. The valve flap assembly of claim 23 wherein the flap is co-molded into connection with the flap carrier frame in a first configuration so that securing of the flap carrier frame to the housing urges the flap into contact with a valve seat surrounding the passage and said contact bends the flap away from the first configuration to a second configuration, said bending generating an elastic force urging the flap toward the valve seat.

32. The valve flap assembly of claim 23 further comprising a second flap formed of the second plastic material and having a hinge edge co-molded into connection with a second wall generally parallel with the first wall, the second flap bendable about a line adjacent the hinge edge.

33. The valve flap assembly of claim 32 wherein the first flap extends toward an interior of the frame and the second flap extends toward an exterior of the frame.

34. The valve flap assembly of claim 23 further comprising at least one flap stiffener co-molded into connection with the flap.

35. The valve flap assembly of claim 34 wherein the flap stiffener comprises an elongated first segment extending generally parallel to the hinge edge of the flap and a second segment extending generally perpendicular to the first segment.

36. The valve flap assembly of claim 23 wherein the flap carrier frame has a plurality of bosses integrally molded therewith and extending therefrom for insertion through respective apertures in the housing to retain the flap carrier frame in connection with the housing.

37. The valve flap assembly of claim 23 wherein the flap has a generally planar central portion and a seal portion surrounding the central portion along all edges other than the hinge edge, and at least a part of the seal portion is curved out of a plane defined by the central portion.

38. The valve flap assembly of claim 28 wherein the flap carrier frame is separate from the housing, the frame including at least one member having a first wall extendible along at least a portion of a perimeter of the passage through the housing, the frame securable to the housing adjacent to the passage such that the first wall is adjacent to the surface edge of the passage.

39. A valve flap assembly for use in a pressure relief valve having a housing with at least one valve seat disposed adjacent a surface edge defining at least one passage formed therethrough, the assembly comprising:

a flap carrier frame injection molded in a first shot of a two-shot co-molding process from a relatively rigid plastic material, the frame securable to the housing adjacent to the passage; and a flap injection molded in a second shot of the co-molding process from a relatively flexible plastic material such that an edge of the flap is joined to the frame along a first wall of the frame.

40. The valve flap assembly of claim 39 wherein at least one flap stiffener is injection molded in the first shot of the co-molding process such that the flap is molded into connection with the flap stiffener.

41. The valve flap assembly of claim 40 wherein the flap carrier is formed as a frame having a substantially continuous perimeter, and the flap is molded substantially within the perimeter of the flap carrier frame.

42. The valve flap assembly of claim 39 wherein a second flap is formed in the second shot of the co-molding process such that an edge of the second flap is joined to a second perimeter wall of the flap carrier frame, the second perimeter wall being spaced from and generally parallel with the first perimeter wall.

43. The valve flap assembly of claim 42 wherein the frame comprises first and second spaced, generally parallel perimeter walls and the first flap is joined to the first perimeter wall and the second flap is joined to the second perimeter wall.

44. The valve flap assembly of claim 39 wherein the flap carrier frame is separate from the housing, the frame including at least one member having a first wall extendible along at least a portion of a perimeter of the passage through the housing, the frame securable to the housing adjacent to the passage such that the first wall is adjacent to the surface edge of the passage.

* * * * *